United States Patent [19]

Mack

[11] Patent Number: 4,686,870

[45] Date of Patent: Aug. 18, 1987

[54] POSITION INCREMENTER

[76] Inventor: James F. Mack, 3695 East Industrial Dr., Flagstaff, Ariz. 86002

[21] Appl. No.: 794,791

[22] Filed: Nov. 4, 1985

[51] Int. Cl.$^4$ .................................................. F16H 35/08
[52] U.S. Cl. ........................................ 74/828; 74/128; 74/830; 92/13.4
[58] Field of Search ................. 74/828, 830, 565, 128; 92/13.4, 13.5

[56] References Cited

U.S. PATENT DOCUMENTS

| | | | |
|---|---|---|---|
| 2,769,573 | 11/1956 | Miller | 92/13.4 X |
| 3,247,356 | 4/1966 | Turbett | 74/828 X |
| 3,247,357 | 4/1966 | Koch | 74/828 X |
| 3,361,373 | 1/1968 | Anderson et al. | 74/828 X |
| 3,822,635 | 7/1974 | Nishimura | 92/13.5 X |
| 4,043,709 | 8/1977 | Grevich | 92/13.4 X |
| 4,072,087 | 2/1978 | Mueller | 92/13.4 X |
| 4,384,576 | 5/1983 | Farmer | 74/828 X |
| 4,527,446 | 7/1985 | Borodin | 74/828 |

*Primary Examiner*—Leslie Braun
*Assistant Examiner*—Dwight G. Diehl
*Attorney, Agent, or Firm*—Nissle & Leeds

[57] ABSTRACT

Apparatus utilized in combination with a carriage reciprocating between a primary base position and a second position spaced away from the primary base position. The apparatus varies the distance of the second position of the carriage from the primary base portion of the carriage and includes a stop surface on the carriage and a plurality of secondary stop surfaces operatively associated with the carriage stop surface. The secondary stop surfaces are each movable between at least two operative positions, a first operative position in which one of the secondary stop surfaces contacts the carriage stop surface when the carriage is moving away from its primary base position, and, a second operative position in which another of the secondary stop surfaces contacts the carriage stop surface when the carriage is moving from its primary base position. When a secondary stop surface contacts the carriage stop surface, the carriage is halted in its second position. Movement of the secondary stop surface between their first and second operative positions is activated by a control mechanism carried on the reciprocating carriage.

3 Claims, 7 Drawing Figures

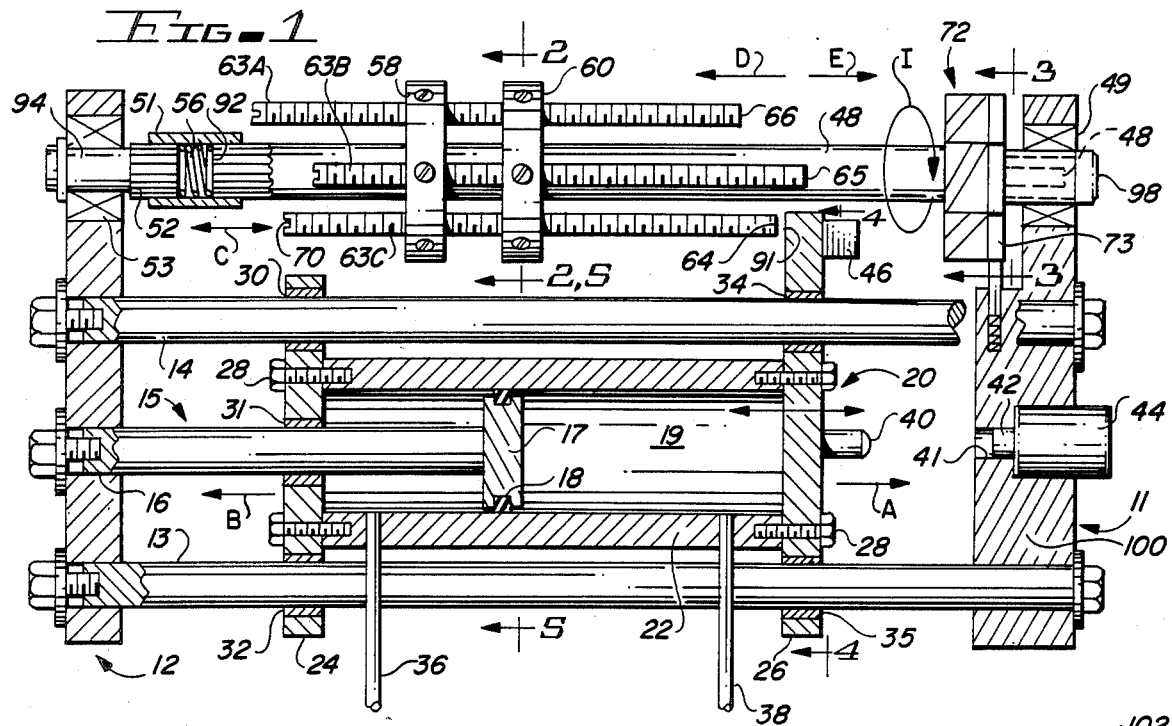
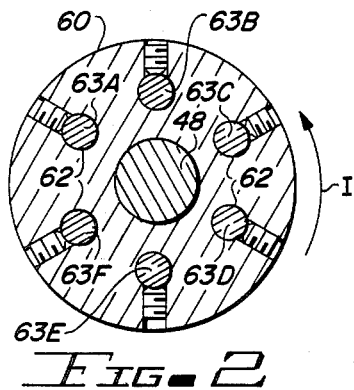
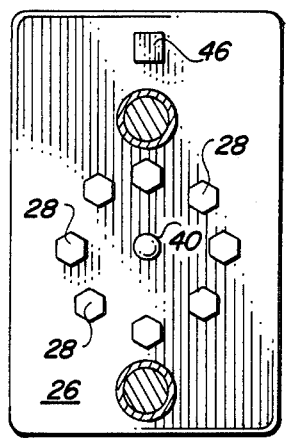
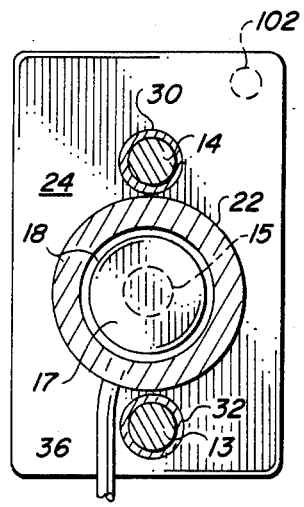
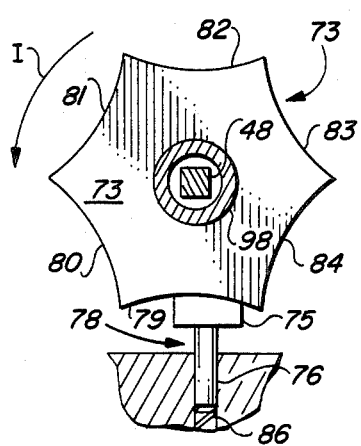
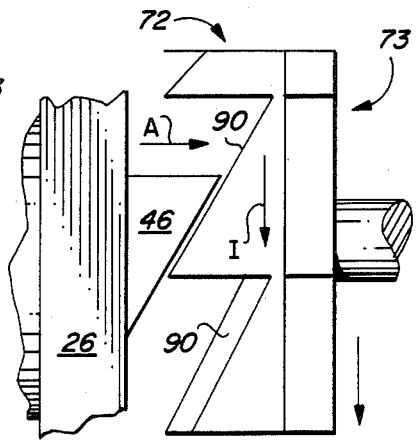
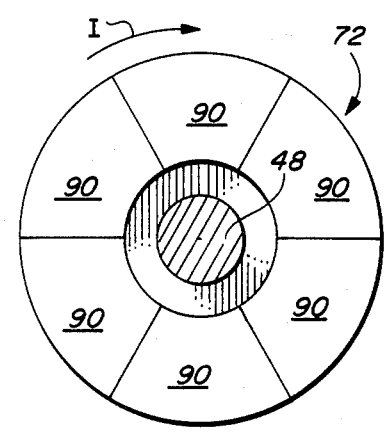

POSITION INCREMENTER

This invention pertains to a control mechanism for automatically incrementally and decrementally varying the distance of travel of a reciprocating carriage from a base position.

More particularly, the invention pertains to robotics apparatus for automatically mechanically varying the position of a pincer, laser, sensor or other robotics action component which is carried on a reciprocating carriage and is utilized to accomplish an operation or in conjunction with an object or device operatively associated with the reciprocating carriage.

Robotics systems are well known in the art and often include apparatus for linearly reciprocating a carriage between a base point and another point spaced away from the base point. A robotics action assembly is mounted on the carriage. The robotics action assembly is utilized to accomplish an operation on or in conjunction with an object or device operatively associated with the carriage. Pincers, lasers, inscription apparatus and sensors are examples of robotics action assemblies. In the operation of robotics systems, it is desirable to be able to repeatedly rapidly accurately incrementally and decrementally vary the position of a reciprocating carriage and its associated action assembly with respect to a base or reference point. Varying the position of the carriage is often accomplished with a computer controlled servomechanism which "hunts" and by trial and error moves a carriage and its associated action assembly to a desired position. While servomechanisms can accurately position a reciprocating carriage, their complexity fosters maintenance problems. Also, the cost of microprocessor controlled servomechanisms is often prohibitive.

Accordingly, it would be highly desirable to provide improved apparatus of simple mechanical construction and operation which would, without requiring computer control, accurately rapidly automatically incrementally and decrementally vary the position of a reciprocating carriage and associated robotics action assembly with respect to a base or reference point.

Therefore, it is an object of the invention to provide improved robotics apparatus for varying the distance of travel of a reciprocating carriage from a base or reference point.

A further object of the invention is to provide improved apparatus for varying the furthest points of travel of a reciprocating carriage and associated robotics action assembly without requiring the utilization of a microprocessor or other electronic control unit.

Still another object of the invention is to provide improved apparatus for automatically mechanically incrementally and decrementally varying the distance of travel of a reciprocating carriage assembly between a base position and various points of furthest travel spaced away from the base position.

Yet a further object of the invention is to provide improved apparatus in which a reciprocating carriage automatically, mechanically determines its distance of travel from a selected base or reference position.

These and other, further and more specific objects and advantages of the invention will be apparent to those skilled in the art from the following detailed description thereof, taken in conjunction with the drawings, in which:

FIG. 1 is a top partial section view illustrating apparatus constructed in accordance with the principles of the invention;

FIG. 2 is a side section view of a portion of the apparatus of FIG. 1 taken along section line 2—2 thereof;

FIG. 3 is a side section view of a portion of the apparatus of FIG. 1 taken along section line 3—3 thereof;

FIG. 4 is a side section view of a portion of the apparatus of FIG. 1 taken along section line 4—4 thereof;

FIG. 5 is a side section view of a portion of the apparatus of FIG. 1 taken along section line 5—5 thereof;

FIG. 6 is a side elevation view illustrating the toothed cam wheel and indexing mechanism of the apparatus of FIG. 1; and, FIG. 7 is a front view illustrating the toothed cam wheel of FIG. 6.

Briefly, in accordance with my invention, I provide apparatus utilized in combination with a carriage reciprocating between at least two operative positions, a primary base position and a second position spaced away from the primary base position. The carriage generally moves in a first direction of travel when moving from the primary base position to the second position and moves in a second direction of travel when moving from the second position to the primary base position. The apparatus utilized in combination with the carriage comprises means for automatically varying the distance of the second position of the carriage from the primary base position of the carriage, the means including a stop surface on the carriage; a plurality of secondary stop surfaces operatively associated with the carriage stop surface and each movable between at least two operative positions, a first operative position in which one of the secondary stop surfaces is positioned to contact the carriage stop surface when the carriage is moving in the first direction of travel and to stop movement of the carriage in the first direction of travel, and a second operative position in which another of the secondary stop surfaces is positioned to contact the carriage stop surface when the carriage is moving in the first direction of travel and to stop movement of the carriage in the first direction of travel; means for displacing the secondary stop surfaces from the first to the second operative positions; and, control means mounted on the carriage for activating the displacing means to cause the secondary stop surfaces to be displaced from the first to the second operative positions. The control means activates the displacing means when the carriage moves in one of the direction of travel.

Turning now to the drawings, which depict the presently preferred emboiments of the invention for the purpose of illustrating the practice thereof and not by way of limitation of the scope of the invention, and in which like reference characters represent corresponding elements throughout the several views, FIGS. 1 to 7 illustrate apparatus constructed in accordance with the principles of the invention and including a frame having end members 11, 12 interconnected by elongate circular rods 13, 14 fixedly secured to members 11, 12. One end of piston rod 15 is fixedly secured in aperture 16 of member 12. The other end of rod 15 is attached to cylindrical piston head 17 having circular O-ring seal 18 around the periphery thereof. O-ring 18 extends outwardly from piston head 17 and contacts inner cylindrical piston housing wall 19. Carriage 20 reciprocates along rods 13, 14 in the directions indicated by arrows A and B and includes hollow cylindrical housing 22 sealingly secured to face plates 24, 26 by bolts 28. Bushings 30 and 32 of face plate 24 and 34, 35 of face plate 26 slidably contact rods 13, 14. Bushing 31 of face plate 24 slidably contacts stationary piston rod 15. Conduits 36, 38 direct pressurized fluid into and from housing 22 on either side of piston head 17. When carriage 20 moves in the direction of arrow A toward member 11, nipple 40 projecting from plate 26 travels into aperture 41 and abuts spring loaded member 42. On being contacted by nipple 40, shock absorbing member 42 is displaced in the direction of arrow A, with the resistance offered by member 42 increasing with the distance member 42 is deflected from its normal operative position of FIG. 1. The spring which resists the movement of member 42 in the direction of arrow A is carried in housing 44 fixedly secured to member 11. Cam 46 is fixedly secured to face plate 26 of carriage 20.

The journal of rod 98 positioned in member 11 is rotatably slidably supported by bearing 49. The left end of rod 48 is slidably received by hollow cylindrical sleeve 51 connected to splined end 52 of rod 94 journalled for rotation in bushing 53 of member 12. End 92 of rod 48 can slide inside sleeve 51 in the directions indicated by arrows C. However, when rod 48 is rotated, sleeve 51 and rod 94 also rotate. Shock absorbing spring 56 resists the travel of end 92 of rod 48 in the direction of arrow D. Cylindrical collars 58, 60 are fixedly secured to rod 48 and each include six internally threaded apertures 62 formed therethrough to receive externally threaded screws 63A-63F each including a stop secondary stop surface 64-69, respectively. Stop surface 67-69 of screws 63D-63F are not visible in FIG. 1. Notches 70 formed in the head of each screw 63A-63F permit a screwdriver to be utilized to adjust the position of stop surfaces 64-69 in the directions indicated by arrows D and E. Cam wheel 72 and cylindrical detent wheel 73 are fixedly secured to rod 98. As shown in FIG. 3, head 75 and neck 76 of detent mechanism 78 are forced by spring 86 against an arcuate indent 79 of wheel 73 to maintain rods 48, 98 in position until cam 46 engages cam wheel 72 in the manner described below. Cam wheel 46 includes six tooth cam surfaces 90 shaped and dimensioned to be engaged by cam 46.

In operation, pressurized fluid is directed through conduit 36 into housing 22 to force carriage 20 in the direction of arrow B. When pressurized fluid is directed through conduit 36 into housing 22, conduit 38 is opened to permit fluid in housing 22 on the right side (in FIG. 1) of piston head 17 to vent out of housing 22 through conduit 38. The movement of carriage 20 in the direction of arrow B is halted when stop surface 91 contacts secondary stop surface 64 of screw 63C. When stop surface 91 initially contacts stop surface 64, rod 48 is displaced in the direction of arrow D. When rod 48 is displaced in the direction of arrow D, end 92 of rod 48 is forced into sleeve 51 and against shock absorbing spring 56. Rod 94 cannot be displaced in the direction of arrow D. After stop surface 64 has halted the movement of carriage 20 in the direction of arrow B, pressurized fluid is directed into housing 22 through conduit 38 to cause carriage 20 to move in the direction by arrow A in FIG. 1. When pressurized fluid is directed through conduit 38 into housing 22, conduit 36 is opened to permit fluid in the portion of housing to the left of piston head 17 in FIG. 1 to vent out of housing 22 through conduit 36. As carriage 22 is displaced in the direction of arrow A, cam 46 (FIG. 6) engages a tooth surface 90 on cam wheel 72 and rotates surface 90, wheel 72, detent wheel 73, cylindrical collars 58 and 60, and screws 63A-63F in the direction of arrow I through an angle of 60°. See FIGS. 1-3, 6 and 7. When wheels 72 and 73 are displaced in the direction of arrow I, screw 63B assumes the position of screw 63C in FIG. 1, screw 63A assumes the position FIG. 1 position of screw 63B, screw 63F assumes the FIG. 1 position of screw 63A, etc. Arcuate indent 80 of wheel 73 rotates in the direction of arrow I (FIG. 3) and is engaged by head 75 of detent mechanism 78. While cam 46 moves in the direction of arrow A and engages a tooth surface 90 to rotate wheels 72 and 73, nipple 40 passes through aperture 41 and contacts shock absorbing member 42. Member 42 and nipple 40 cooperate to gradually decelerate carriage 20. After the travel of carriage 20 in the direction A has been halted by shock absorber 42 and member 11, pressurized fluid, preferably air, is directed through conduit 36 into housing 22 to move carriage 20 in the direction of arrow B. When pressurized fluid is directed through conduit 36 into housing 22, conduit 38 is opened to permit fluid contained in housing 22 to the right (in FIG. 1) of piston head 17 to vent from housing 22 through conduit 38. After pressurized fluid is directed through conduit 36 into housing 22, carriage 20 travels in the direction of arrow B until stop surface 91 contacts stop secondary stop surface 65 of screw 63B. After the travel of carriage 20 in the direction of arrow B has been halted by stop surface 65, pressurized fluid is directed into conduit 28 to continue the reciprocation of carriage 20 and the sequential indexing of each screw 63A-63F to the operative position where the stop surface of the screw contacts surface 91 of carriage 20 to halt the travel of carriage 20 in the direction of arrow B. The operative position in which the stop surface 64-69 of a screw 63A-63F will contact surface 91 of carriage is the position occupied by screw 63C in FIG. 1. In the embodiment of the invention illustrated in FIG. 1, only one secondary stop surface 64-69 at a time contacts surface 91. If desired, two or more secondary stop surfaces 64-69 could simultaneously contact stop surface 91 of carriage 20.

The distance of travel of carriage 20 from its base or reference position adjacent member 11 in the direction of arrow B is determined by the position of the secondary stop surface 64-69 which will be contacted by stop surface 91. The positions of stop surfaces 64-69 are, as earlier described, readily adjusted by turning screws 63A-63F through collars 58, 60 in the directions of arrows D and E with the air of a screwdriver.

In describing the operation of the embodiment of the invention shown in the drawings, the base or reference position of carriage 20 was defined as comprising the position of carriage 20 when the travel of carriage 20 in the direction of arrow A has been halted and carriage 20 is adjacent member 11. As would be appreciated by those of skill in the art, the base position could be arbitrarily defined as comprising any possible position of carriage 20 or as comprising a point outside the possible positions which can be occupied by carriage 20. For instance, point 100 in FIG. 1 could be selected as the base or reference position of carriage 20.

A pincer, sensor, inscription device or other robotics action assembly 102 can be mounted on carriage 20. See FIG. 5. The robotics action assembly 102 can, when carriage 20 is in its base position or is in position with stop surface 91 contacting one of secondary stop surfaces 64-69, accomplish an operation on or in conjunction with an object or device operatively associated with carriage 20. Action assembly 102 can also, if appropriate, accomplish an operation on or in conjunction with an object or device when carriage 20 is moving between its base position and the position in which surface 90 contacts one of surfaces 46–69.

As noted, cam wheel 72 is fixedly attached to hollow rod 98. A square aperture extends through the center of cam wheel 72 and slidably receives the square end of rod 48. In FIG. 1, the square end of rod 48 is the dashed right hand end. The right hand end of rod 48 can therefor slide in the directions of arrows D and E through the square aperture in cam wheel 72. During operation of the apparatus of the drawings, cam wheel 72 and hollow rod 98 rotate in the direction of arrow I but are never displaced in the direction of either arrow D or arrow E. When rod 48 is displaced in the directions of arrows D or E, the square right hand end of the rod slides back and forth through the square aperture of cam wheel 72 and back and forth inside hollow rod 98. When cam 46 engages and rotates cam wheel 72, the square aperture passing through the center of cam wheel 72 engages the square right hand end of rod 48 and causes rod 48 to rotate with cam wheel 72 in the direction of arrow I. An end view of the right hand end of rod 48 is shown in FIG. 3 of the drawings.

Having described the invention in such terms as to enable those skilled in the art to which it pertains to understand and practice it, and having described the presently preferred embodiments thereof, I claim:

1. In combination with reciprocating carriage apparatus, said apparatus including
   a housing,
   an elongate rod mounted in said housing and having a longitudinal axis, and
   a carriage mounted on said rod to slidably linearly reciprocate therealong between a plurality of operative positions, including
      a primary base position,
      a secondary position spaced a first distance away from said primary base position, and
      a tertiary position spaced a second distance away from said primary base position, said second distance differing from said first distance,
   said carriage generally moving
      in a first direction of travel when moving from said primary base position to one of said secondary and tertiary positions, and
      in a second direction of travel when moving from one of said secondary and tertiary positions to said primary base position,
   means for varying the distance said carriage linearly travels in said first direction of travel away from said primary base position, said means including
      (a) a support member rotatably mounted on said housing and spaced away from said elongate rod;
      (b) a stop surface on said carriage spaced away from said elongate rod in a direction generally toward said support member;
      (c) at least a pair of secondary stop surfaces mounted on said support member for rotation therewith and operatively associated with said carriage stop surface, each of said secondary stop surfaces movable between at least two operative index positions,
         (i) a first operative position in which said secondary stop surface is positioned to contact said carriage stop surface when said carriage is moving in said first direction of travel and to stop said carriage in one of said secondary and tertiary positions, and
         (ii) a second operative position in which said secondary stop surface will not contact said carriage stop surface when said carriage is moving in said first direction of travel;
      (d) a control member carried on said support member for rotating said member when said carriage is moving to said base position from one of said secondary and tertiary operative positions in said second direction of travel, said control member having a first contact surface generally at an angle with respect to said longitudinal axis of said elongate rod; and,
      (e) a second contact surface on said carriage
         (i) spaced away from said elongate rod in a direction generally toward said support member,
         (ii) linearly reciprocating with said carriage, and
         (iii) shaped and dimensioned to
            engage and slidably move over said first contact surface when said carriage and second contact surface are moving in said second direction of travel toward said primary base position, and
            rotate said control member and support member and simultaneously rotate each of
   said secondary stop surfaces between said first and second operative positions,
   said carriage providing the motive power to rotate said control member and support member.

2. The reciprocating carriage apparatus of claim 1, including shock absorber means connected to said support member to permit said support member and secondary stop surfaces to be resiliently displaced in said first direction of travel when said carriage stop surface contacts one of said secondary stop surfaces.

3. The reciprocating carriage apparatus of claim 1, including a robotics action assembly connected to said carriage.

* * * * *